United States Patent
Hultsch et al.

[11] Patent Number: 6,042,436
[45] Date of Patent: *Mar. 28, 2000

[54] SHIFTABLE DISK CLUTCH OR DISK BRAKE

[75] Inventors: Hartmut Hultsch, Köngisbrunn; Burkhard Pinnekamp, Augsburg, both of Germany

[73] Assignee: R E N K Aktiengesellschaft, Augsburg, Germany

[*] Notice: This patent is subject to a terminal disclaimer.

[21] Appl. No.: 09/107,775

[22] Filed: Jun. 30, 1998

[30] Foreign Application Priority Data

Jun. 30, 1997 [DE] Germany ............... 197 27 798

[51] Int. Cl.7 .................................................. B63H 23/02
[52] U.S. Cl. ............................................. 440/74; 440/75
[58] Field of Search .................... 440/74, 75; 192/13 R

[56] References Cited

U.S. PATENT DOCUMENTS

| | | |
|---|---|---|
| 2,888,101 | 5/1959 | Bayles . |
| 3,763,977 | 10/1973 | Sink ..................................... 192/13 R |
| 4,142,619 | 3/1979 | Spokas ................................. 192/13 R |
| 4,458,799 | 7/1984 | Schueller .................................. 440/74 |
| 4,795,004 | 1/1989 | Bauer . |
| 5,172,797 | 12/1992 | Stout et al. ............................ 192/13 R |

FOREIGN PATENT DOCUMENTS

| | | |
|---|---|---|
| 1 505 600 | 11/1970 | Germany . |
| 1 655 328 | 4/1971 | Germany . |
| 83 16 977 | 11/1983 | Germany . |
| 33 09 104 | 9/1984 | Germany . |
| 35 03 659 | 8/1986 | Germany . |

OTHER PUBLICATIONS

Article entitled "Caliper Disc Brakes" by S.E. Sherlock published in SAE Montreal Section Paper, Jun., 1958, pp. 43–45.

*Primary Examiner*—Stephen Avila
*Attorney, Agent, or Firm*—Cohen, Pontani, Lieberman & Pavane

[57] ABSTRACT

A shiftable disk clutch or disk brake having two clutch parts which are rotatable relative to one another about a theoretical axis of rotation. One of the clutch parts has at least one rigid pressure disk which is connected with the clutch part so as to be fixed against movement and rigid. The other clutch part has at least two friction disks which are stiff in the circumferential direction and axially flexible in the manner of a diaphragm and are connected with this other clutch part so as to be fixed with respect to movement and rigid and are arranged on both sides of the pressure disk.

12 Claims, 3 Drawing Sheets

SHIFTABLE DISK CLUTCH OR DISK BRAKE

BACKGROUND OF THE INVENTION

1. Field of the Invention

The invention is directed to a shiftable disk clutch or disk brake. The shiftable disk clutch is preferably used in the drivetrain of a ship between a prime mover and a ship's propeller shaft.

2. Discussion of the Prior Art

Known ship drive systems, especially for shuttle tankers, include a diesel engine, especially a two-cycle diesel engine, which is in driving connection with a ship's propeller shaft by means of a flexible, non-shiftable clutch and a tooth clutch. The ship's propeller shaft is provided with an axial pressure bearing for receiving axial thrust or shear forces. The shaft connection arranged between the flexible clutch and the tooth clutch can be provided with a power take-off gear unit (PTO or power take-off drive) for driving an electric generator and/or other units in the ship. During driving operation of the ship, the ship's engine drives the propeller shaft and, by way of the power take-off, also the onboard generator. The ship's propeller shaft must be disconnected from the ship's drivetrain so that the onboard generator can also be driven when the ship is stopped, for example, when the ship is docked. This disconnection is carried out by opening the tooth clutch. However, the tooth clutch can only be opened or closed when both the engine shaft and ship's propeller shaft are at a complete stop.

In the prior art, this opening and closing of the tooth clutch is carried out manually, wherein it is very time-consuming and difficult when closing the tooth coupling to align the teeth of one clutch part with the tooth spaces of the other clutch part and bring them into engagement. For this purpose, the ship's propeller shaft must often be blocked so that it will not be turned by the movement of the water. The ship's driving engine must be driven at a slow rate of rotation and switched off in an exact manner while taking into account the slow-down or run-out path such that the engine shaft aligns the teeth of one clutch part with the tooth spaces of the other clutch part. A further disadvantage of the tooth clutch is that it cannot be remotely operated, but must be actuated manually in situ. The engagement and disengagement of the tooth clutch must be carried out a number of times in a day, for example, if the ship in question is a shuttle tanker.

Another disadvantage of the tooth clutch is that the teeth of one clutch part must have some clearance or play in the tooth spaces of the other clutch part so that they can engage. However, this results in vibration problems and the teeth will strike against one another, leading to material wear and loud noise. When a remotely operated shiftable multiple-disk clutch is used instead of the manually shiftable tooth clutch, there is a danger that the loading of the ship's propeller shaft by the ship's driving engine will suddenly be interrupted in the event of a failure of the clutch closing pressure, so that the ship's driving engine overspeeds and is damaged. Another problem in all drive systems is that there is only limited space available for its installation in the ship or other engine compartment.

SUMMARY OF THE INVENTION

Accordingly, it is an object of the present invention to provide a shiftable clutch which avoids the disadvantages mentioned above, wherein, in particular, the clutch can be remotely actuated without sudden loss of load on the driving engine due to failure of actuating means and consequent overspeeding. Further, vibration problems and generation of noise are prevented through the elimination of play in the clutch. In addition, the inventive construction is compact so that the clutch can also be used in small engine compartments.

Pursuant to this object, and others which will become apparent hereafter, one aspect of the present invention resides in a shiftable disk clutch comprised of two clutch parts that are rotatable relative to one another about an axis of rotation. At least one non-flexible, circumferentially rigid pressure disk is connected to one of the clutch parts so as to be fixed against movement and rigid in every direction. The pressure disk has two end sides with friction surfaces. At least circumferentially rigid friction disks are connected to the other of the clutch parts so as to be fixed against movement and rigid in every direction. Each of the friction disks has a friction part that is axially movable in a springing-resilient manner relative to the other clutch part against an axial spring force. Axially acting spring means are provided for applying the axial spring force on the friction parts. The friction parts are arranged on both sides of the pressure disk and have friction surfaces located axially opposite to the friction surfaces of the pressure disks. Remotely actuable pressure means are operatively connected to one of the clutches for axially moving the friction parts of the frictions disks relative to the pressure disk, against the spring-resilient force of the friction parts, so as to selectively engage and disengage the friction surfaces of the friction parts and the friction surfaces of the pressure plate. Finally, means are provided for centering the two clutch parts relative to one another.

The invention provides a disk clutch which can be actuated remotely, has a compact construction, can contain at least single redundancy through which, in the event of failure of one clutch closing system, another clutch closing system automatically maintains the multi-disk clutch in operation so that the risk of a sudden load dropoff of the ship's driving engine, and consequently also an overspeeding and destruction of the ship's driving engine, is prevented.

In another embodiment of the invention the friction parts of the friction disks are arranged at a distance axially from the pressure disk so as to be pressable against the pressure disk against the axial spring force by the pressure means.

Yet a further embodiment provides that the axially acting spring means includes a thin, diaphragm-like, flexible connecting piece which is spring-resilient in the axial direction and connects the friction disk part that is rigidly connected with the other clutch part with the friction parts of the friction disks.

In still another embodiment of the invention manually actuable means are provided for axially actuating the friction parts of the friction disks. The manually actuable means are provided in addition to the remotely actuable pressure means.

In another embodiment the remotely actuable pressure means is divided into at least two separate pressure systems which are operative to move the friction parts of the friction disks one of axially, jointly and individually depending upon operating conditions, and can accordingly be coupled and uncoupled from the pressure disk.

In still another embodiment the centering means includes a centering pin arranged axially along the axis of rotation as part as one of the clutch parts and is formed with a conical tip. A centering opening is formed in the other of the clutch parts and has a funnel shape which compliments the conical tip of the centering pin. The centering means and the remotely actual pressure means are connected with one another functionally so that the centering pin is automatically inserted into the centering opening when the friction surfaces are engaged and the two clutch parts are accordingly centered radially with respect to one another. The centering pin is automatically separated axially from the wall of the centering opening when the friction surfaces are separated from one another.

In yet a further embodiment of the invention a bearing is provided between the two clutch parts for supporting the clutch parts radially and axially relative to one another.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
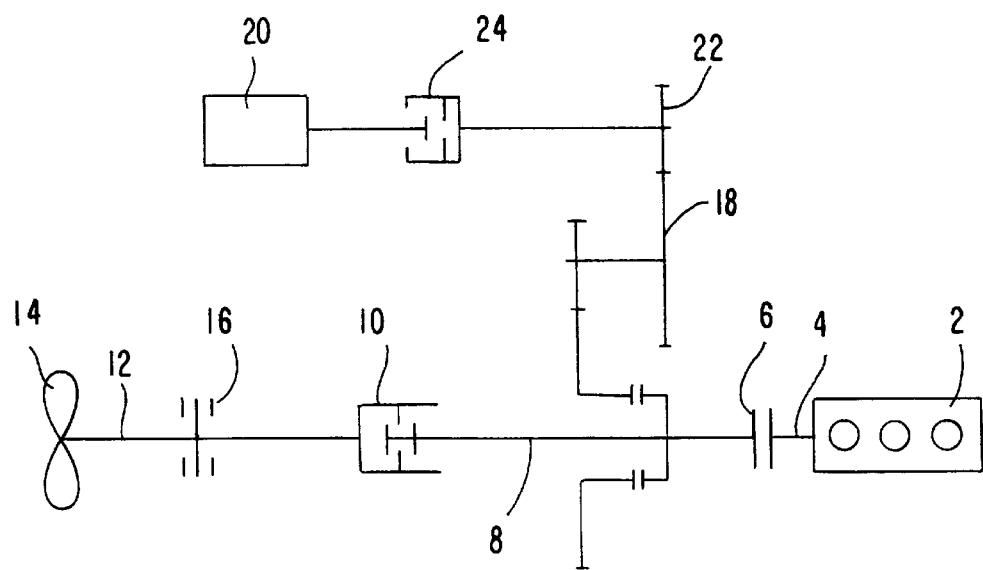
FIG. 1 shows a ship's drivetrain, especially for a shuttle tanker, constructed in accordance with the invention.
Figure 2:
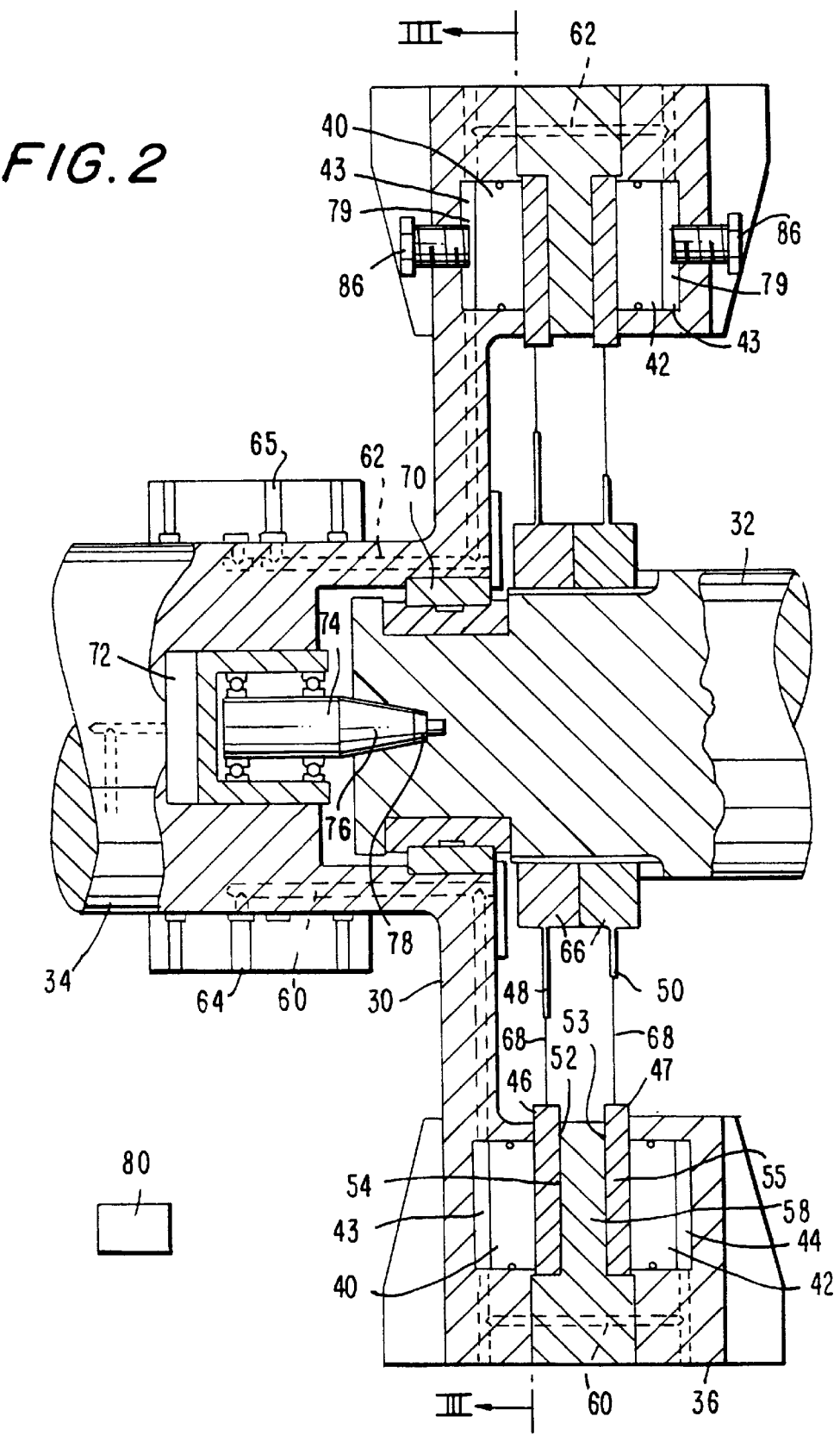
FIG. 2 shows a longitudinal section through a disk clutch according to the invention as used in the ship's drive system in accordance with FIG. 1.
Figure 3:
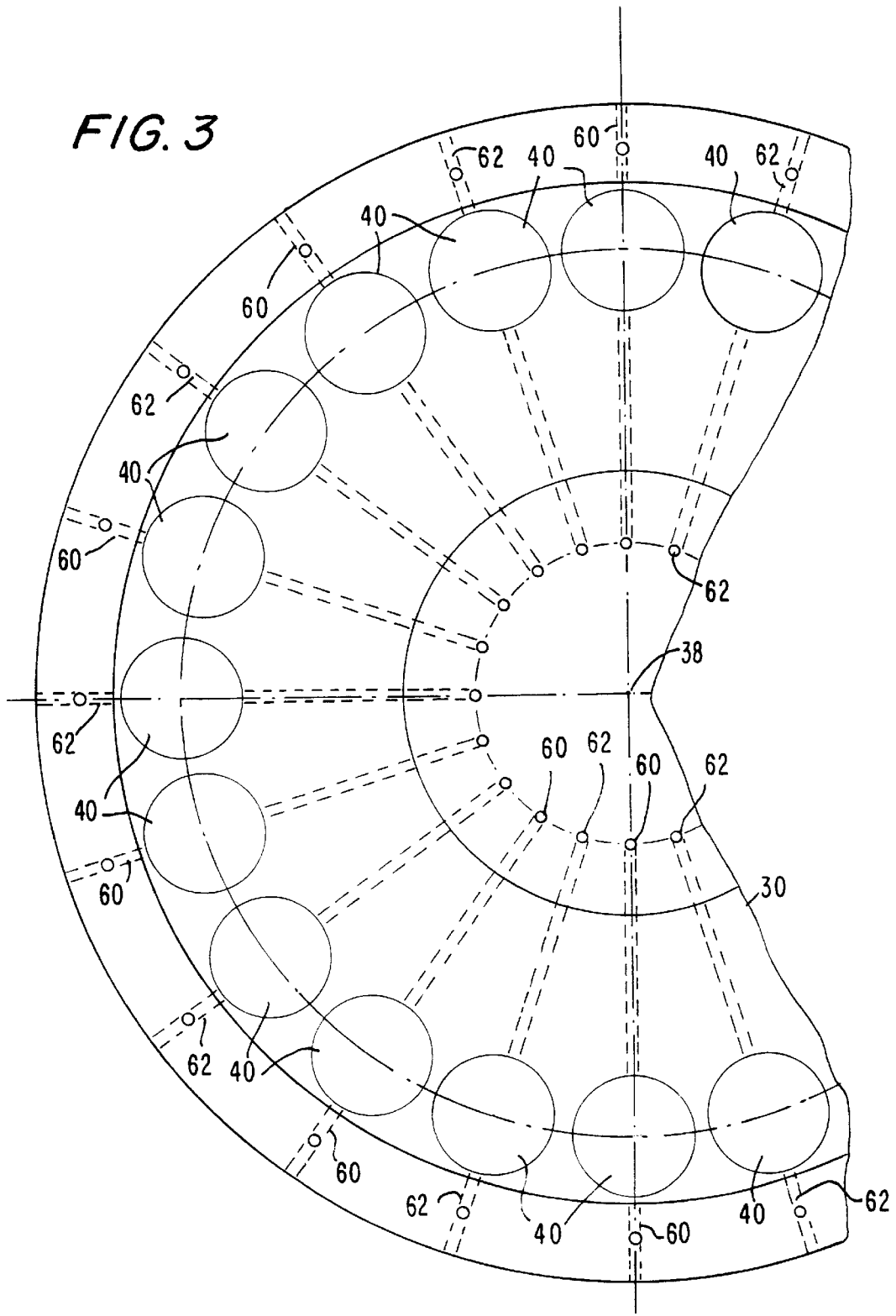
FIG. 3 shows a schematic sectional view along the line III—III in FIG. 2.

FIG. 1 is not true to scale and is shown in a substantially smaller scale than that of FIGS. 2 and 3.

FIG. 1 shows successively in the drive direction a two-cycle diesel engine 2 whose engine shaft 4 is in a drive connection with a ship's propeller shaft 12, provided with a ship's propeller 14, by means of an elastic or flexible clutch 6, an intermediate shaft train 8, and a shiftable disk clutch 10 which can be remotely actuated. The ship's propeller shaft 12 is provided with an axial bearing arrangement 16 for receiving axial thrust. Apart from the ship's propeller shaft 12, the intermediate shaft train 8 also drives a power take-off 18 for onboard units of the ship, not shown, for example, an electric generator 20 for generating the onboard power supply. According to FIG. 1, the power take-off 18 (PTO) can comprise a plurality of gearwheels or toothed wheels whose driven gearwheel 22 is connected to the generator 20 by a shiftable power take-off clutch 24. The generator 20 can also serve as an electric motor for returning electrical energy to the intermediate shaft train 8.

The remotely actuatable, shiftable disk clutch 10, which can also be used as a disk brake, has two clutch parts 30, 32, one of which can be the input or output. In the present example, it is assumed that clutch part 30 is the output part and the other clutch part 32 is the input part. The output clutch part 30 has a shaft portion 34 to which the ship's propeller shaft 12 is connected and a cylinder portion 36 having a larger diameter. The cylinder portion 36 contains a first plurality of first pistons 40 arranged annularly about an axis of rotation 38 of the clutch and a second plurality of second pistons 42 which are arranged annularly about the axis of rotation 38 at an axial distance from the first pistons 40 so as to be aligned with the first pistons 40. The pistons 40, 42 can be clamped or tensioned in cylinder bores 43, 44, respectively, in opposite directions relative to one another parallel to the axis of rotation 38 by actuating hydraulic fluid in order to press the radial outer friction parts 46, 47 of friction disks 48, 50 by their front friction surfaces 52, 53 which face one another against front friction surfaces 54, 55 of a pressure disk 58 which project away from one another in opposite directions and thus in order to close the disk clutch. The pressure disk 58 is a nonflexible ring which is rigid in every direction and is connected with the clutch part 30 so as to be fixed with respect to movement and rigid in every direction (axially and radially).

The first plurality of annularly arranged first pistons 40 and the second plurality of second pistons 42 are actuated in their cylinder bores 43, 44 by two separate pressure means systems 60, 62. One pressure means system 60 is hydraulically connected in the circumferential direction about the axis of rotation 38 with the first, third, fifth, seventh, ninth, etc. cylinder bore 43, 44 for actuating pistons 40, 42, and the second, fourth, sixth, eighth, tenth, etc. cylinder bores 43, 44 which are disposed intermediately between the latter in the circumferential direction are hydraulically connected with the other pressure means system 62 for actuating their pistons 40, 42. Each of the two cylinder bores 43, 44 which are located opposite from one another axially is connected to the same pressure means system 60 or 62. Therefore, the friction parts 46, 47 of the friction disks 48, 50 can be pressed against the pressure disk 58 in normal operation by the hydraulic fluid of both pressure means systems 60, 62, wherein, in the event of failure of one of the two pressure means systems, the pressure of the pressure means system 60 or 62 still functioning is sufficient to press the friction parts 46, 47 of the friction disks 48, 50 against the pressure disk 58 with adequate force to prevent a relative movement between the friction disks 48, 50 and the pressure disk 58 when the clutch is to be closed. The two pressure means systems 60, 62 each have their own duct system which extends from a pressure medium connection 64 or 65 at the shaft portion 34 of one clutch part 30, through this clutch part 30, to the respective cylinder bores 43, 44. According to modified embodiments, two or more cylinder bores 43, 44 arranged adjacent to one another in the circumferential direction of the clutch can also be connected to the same pressure means system 60 or 62, and a corresponding quantity of cylinder bores 43, 44 is located in the circumferential portions disposed therebetween, these cylinder bores 43, 44 being connected to the respective other pressure means system 62 or 60.

The pressure disk 58 is a body which is nonflexible and rigid in every direction and is connected with the clutch part 30 so as to be fixed with respect to movement and rigid in every direction. This is the preferred embodiment. In a modified embodiment, the pressure disk 58 could be a movable diaphragm which is flexible in a springing-resilient manner in the axial direction, but which is stiff in the circumferential direction about the axis of rotation 38 and is rigidly connected with the clutch part 30.

Every friction disk 48, 50 has, at its radial inner end, a connection part 66 which is connected to the other clutch part 32 so as to be fixed against movement and rigid in the axial and radial directions. Each friction disk 48, 50 is connected by its connection part 66 with the friction part 46, 47, respectively, by means of a thin, diaphragm-like, flexible connecting piece 68 which is located in a radial plane and is springing-resilient in the axial direction. The springing-resilient, flexible connecting piece 68 holds the friction parts 46, 47 at a distance axially from the pressure disk 58 and brings them back into this disengaged clutch position when the pressure of the hydraulic fluid in the cylinder bores 43, 44 drops to a value whose axial force is less than the axial force of the springing-resilient, flexible connecting pieces 68. The hydraulic fluid in the cylinder bores 43, 44 must therefore overcome the axial spring pressure of the flexible connecting pieces 68 in order to close the clutch.

The drawings show only one clutch unit having a pressure disk 58 between two friction disks 48, 50. According to modified embodiments, a plurality of such clutch units can be arranged axially one behind the other, wherein each pressure disk 58 is a component part of one clutch part 32 and the friction disks 48, 50 are a component part of the other clutch part 42. Since the clutch closing forces act on both front sides of the pressure disk 58, high closing forces can be generated, and therefore high torques can be transmitted, without requiring a large-volume clutch with many parts.

The two clutch parts 30, 32 are supported inside one another axially and radially by a bearing arrangement 70.

As a result of the special construction of the shiftable disk clutch 10, the two clutch parts 30, 32 are rigidly connected with one another by the pressure disk 58 and the friction disks 48, 50 so as to be free of play when the clutch is closed. However, in a bearing arrangement 70, there is always clearance. In order to prevent radial alignment errors between the two clutch parts 30, 32, a centering device 72 is provided which centers the two clutch parts 30, 32 radially with respect to one another on the center axis 38 before the clutch is switched from the open state into the closed state. The centering device 72 has a centering pin 74 which is arranged axially on the axis of rotation 38 with an axial conical tip 76 at the clutch part 30 and a centering opening 78 located axially opposite thereto in the other clutch part 32. The centering opening 78 has a funnel shape which complements the conical tip of the centering pin. The centering pin 74 is axially adjustable relative to the two clutch parts 30, 32. Before closing the disk clutch, the conical tip 76 of the centering pin 74 is inserted into the centering opening 78 until it contacts the opening wall, and can be drawn back again after the disk clutch is opened until it no longer makes contact in the centering opening 78. The centering pin 74 is displaced axially in the centering opening 78 preferably against the force of spring means (not shown) by hydraulic fluid in a pressure chamber 79 which is formed in the clutch part 30, wherein the hydraulic fluid of one of the two pressure means systems 60 or 62 or another hydraulic fluid which is put under pressure simultaneously with the hydraulic fluid of the pressure means systems 60, 62 can be used as hydraulic fluid. A control device 80 controls the supply and discharge of the hydraulic fluids for the pressure means systems 60, 62 and the centering device 72.

Hydraulic fluid is the preferred medium for actuating the pressure means systems 60, 62 and the centering device 72. According to modified embodiments, however, compressed air or an electromagnetic system can also be used.

The pressure disk 58 and the friction disks 48, 50 now have the shape of a ring which is arranged concentric to the axis of rotation 38.

According to a modified embodiment, not shown, the centering pin 74 can be arranged in the other clutch part 32 so as to be axially displaceable and the centering opening 78 can be formed in the clutch part 30.

In order to prevent the ship from becoming incapacitated for travel in the event of total failure of both pressure means systems 60, 62, and to ensure in this case that the ship's driving engine 2 can be maintained in a drive connection with the ship's propeller shaft 12, mechanical means can be provided, for example, in the form of threaded pins 86 which can be screwed into one clutch part 30 parallel to the axis of rotation 38 for pressing the pistons 40, 42 together with the friction disks 48, 50 against the pressure disk 58 and thus closing the clutch.

The invention is not limited by the embodiments described above which are presented as examples only but can be modified in various ways within the scope of protection defined by the appended patent claims.

We claim:

1. A shiftable disk clutch for engaging and disengaging a ship's propeller shaft to and from a drive motor, comprising:

two clutch parts rotatable relative to one another about an axis of rotation;

at least one circumferentially rigid, non-flexible pressure disk connected to one of the clutch parts so as to be fixed against movement and rigid in every direction, the pressure disk having two end sides with friction surfaces;

at least two circumferentially rigid friction disks connected to another of the clutch parts so as to be fixed against movement and rigid in every direction, each of the friction disks having a friction part that is axially movable in a springing-resilient manner relative to the other clutch part against an axial spring force, the friction parts being arranged on both sides of the pressure disk and having friction surfaces located axially opposite to the friction surfaces of the pressure disk;

axially acting spring means for applying the axial spring force on the friction parts to disengage the friction parts from the pressure disk;

remotely actuatable pressure means operatively connected to one of the clutch parts for axially moving the friction parts of the friction disks relative to the pressure disk, against the springing-resilient force of the friction parts, so as to selectively engage and disengage the friction surfaces of the friction parts and the friction surfaces of the pressure plate; and means for centering the two clutch parts relative to one another.

2. A shiftable disk clutch according to claim 1, wherein the friction parts of the friction disks are arranged at a distance axially from the pressure disk so as to be pressable against the pressure disk against the axial spring force by the pressure means.

3. A shiftable disk clutch according to claim 1, wherein the axially acting spring means includes a thin, flexible connecting piece which is springing-resilient in the axial direction and connects a friction disk part that is rigidly connected with the other clutch part with the friction parts of the friction disks.

4. A shiftable disk clutch according to claim 1, and further comprising means for axially actuating the friction parts of the friction disks, said means being manually actuatable in situ and in addition to the remotely actuatable pressure means.

5. A shiftable disk clutch according to claim 1, wherein the remotely actuatable pressure means is divided into at least two separate pressure systems which are operative to move the friction parts of the friction disks axially, jointly and individually depending on operating conditions, and can accordingly be coupled with and uncoupled from the pressure disk.

6. A shiftable disk clutch according to claim 5, wherein the remotely actuatable pressure means includes a plurality of pressure elements arranged on an end side of the friction disks that is remote of the friction surfaces of the friction disks so as to be distributed annularly about the axis of rotation so as to actuate the friction parts of the friction disks axially, located between each of a plurality of circumferential portions, each of which has at least one pressure element which is actuated by one of the pressure system, is a circumferential portion in which there is located at least another one of the pressure elements which is actuated by the other pressure system.

7. A shiftable disk clutch according to claim 1, wherein the remotely actuatable pressure means are hydraulic fluid pressure means.

8. A shiftable disk clutch according to claim 1, wherein the centering means includes a centering pin arranged axially along the axis of rotation as part of one of the clutch parts and has a conical tip, and a centering opening formed in the other of the clutch parts so as to have a funnel shape which complements the tip, the centering pin being insertable in the centering opening.

9. A shiftable disk clutch according to claim 8, wherein the centering means and the remotely actuatable pressure means are connected with one another functionally so that the centering pin is automatically inserted into the centering opening wall when the friction surfaces are engaged and the two clutch parts are accordingly centered radially with respect to one another, the centering pin being automatically separated axially from the centering opening wall when the friction surfaces are separated from one another.

10. A shiftable disk clutch according to claim 1, wherein the pressure disk is nonflexible and stiff axially and radially.

11. A shiftable disk clutch according to claim 1, and further comprising bearing means between the two clutch parts for supporting the clutch parts radially and axially relative to one another.

12. A combination, comprising:

a prime mover;

a propeller shaft; and a shiftable disk clutch arranged between the prime mover and the propeller shaft, the disk clutch including:
  two clutch parts rotatable relative to one another about an axis of rotation;
  at least one circumferentially rigid non-flexible pressure disk connected to one of the clutch parts so as to be fixed against movement and rigid in every direction, the pressure disk having two end sides with friction surfaces;
  at least two circumferentially rigid friction disks connected to another of the clutch parts so as to be fixed against movement and rigid in every direction, each of the friction disks having a friction part that is axially movable in a springing-resilient manner relative to the other clutch part against an axial spring force, the friction parts being arranged on both sides of the pressure disk and having friction surfaces located axially opposite to the friction surfaces of the pressure disk;
  axially acting spring means for applying the axial spring force on the friction parts to disengage the friction parts from the pressure plate;
  remotely actuatable pressure means operatively connected to one of the clutches for axially moving the friction parts of the friction disks relative to the pressure disk, against the springing-resilient force of the friction parts, so as to selectively engage and disengage the friction surfaces of the friction parts and the friction surfaces of the pressure plate; and
  means for centering the two clutch parts relative to one another.

* * * * *